United States Patent [19]

Baxter, Jr. et al.

[11] Patent Number: 4,692,854
[45] Date of Patent: Sep. 8, 1987

[54] METHOD AND APPARATUS FOR MODULATING INVERTER PULSE WIDTH

[75] Inventors: Richard V. Baxter, Jr., Appleton; Robert F. Bourke, Fairchild; David R. Ellingson, Tomah; Terrance D. Paul, Port Edwards; David L. Layden, New Lisbon, all of Wis.

[73] Assignees: Best Power Technology, Inc, Necedah; Pensar Corporation, Appleton, both of Wis.

[21] Appl. No.: 835,950

[22] Filed: Mar. 4, 1986

[51] Int. Cl.$^4$ ............................................. H02M 7/00
[52] U.S. Cl. ........................................ 363/75; 363/41
[58] Field of Search .................. 363/15, 16, 27, 41, 363/75

[56] References Cited

U.S. PATENT DOCUMENTS

| | | | |
|---|---|---|---|
| 4,148,097 | 4/1979 | Deisch | 363/49 |
| 4,439,822 | 3/1984 | Cocconi | 363/75 |

Primary Examiner—William H. Beha, Jr.
Assistant Examiner—Anita M. Ault
Attorney, Agent, or Firm—Michael Piontek

[57] ABSTRACT

A method and apparatus are disclosed for use with a battery powered inverter for powering a load through a ferroresonant transformer. The current flow through the inverter-ferroresorant transformer is sensed and is utilized to modulate the inverter's pulse width at a point, after a peak voltage but before saturation begins, when the slope of the inverter-ferroresonant transformer current with respect to time is at or near zero. A maximum current limiting feature can be provided in the method and apparatus of the present invention.

20 Claims, 4 Drawing Figures

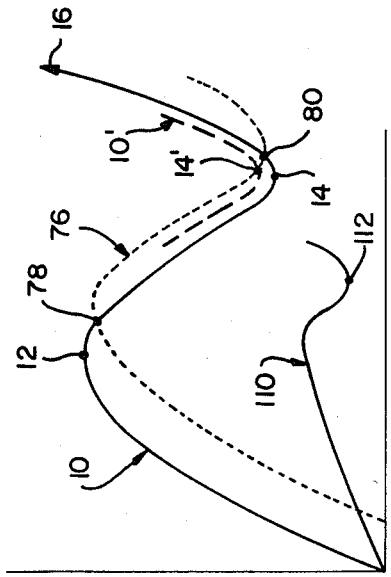
FIG. 1
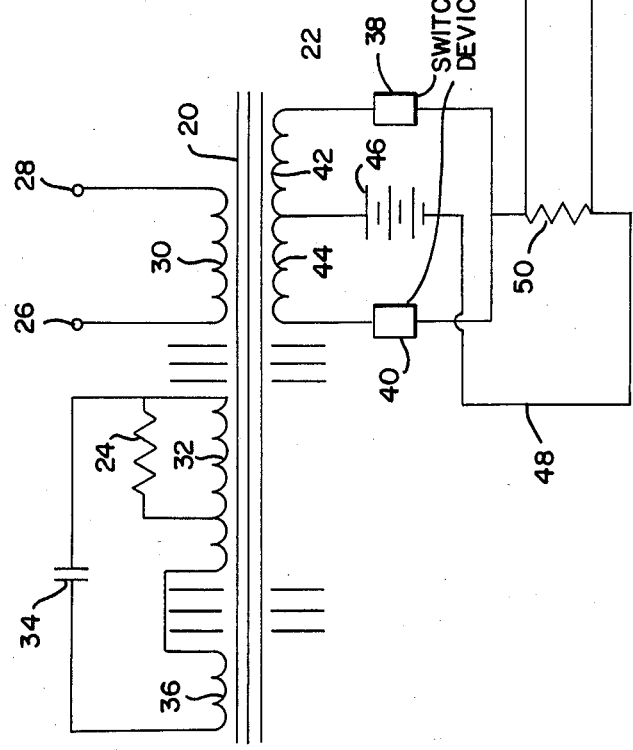
FIG. 2
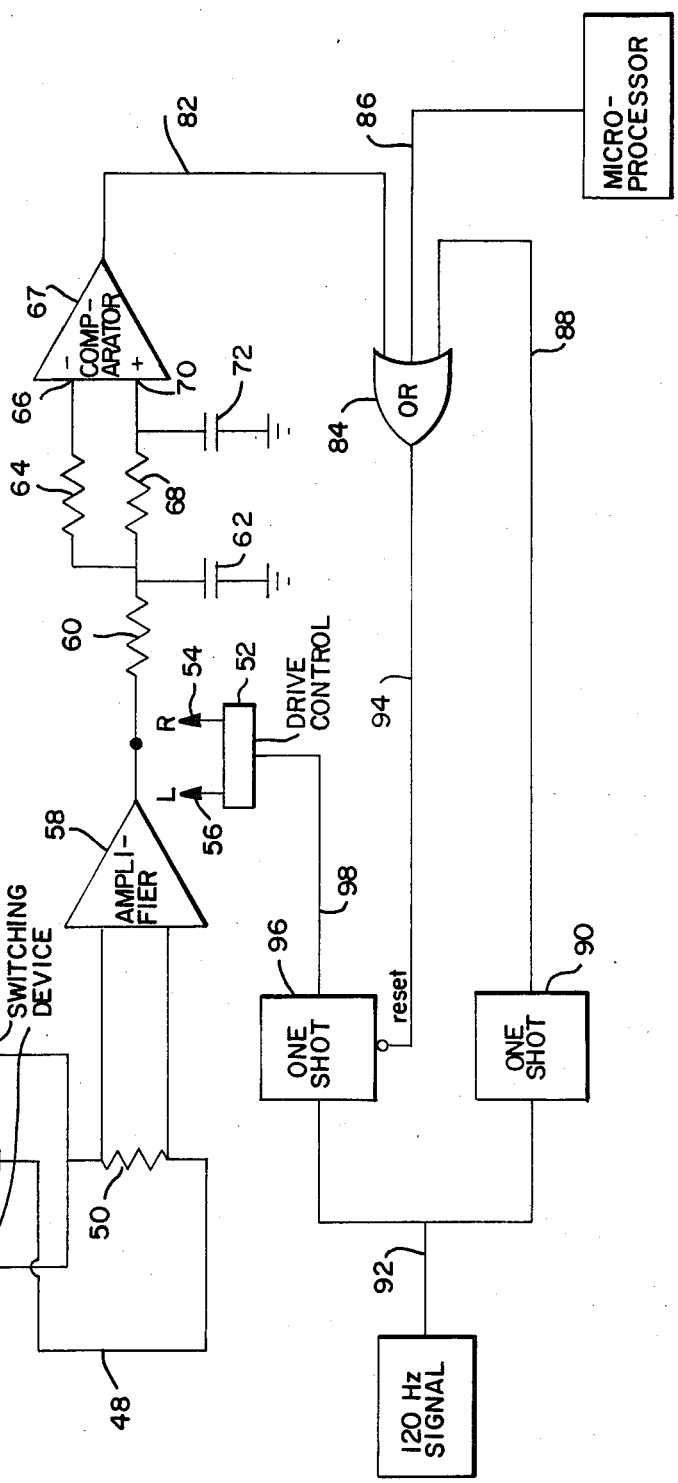

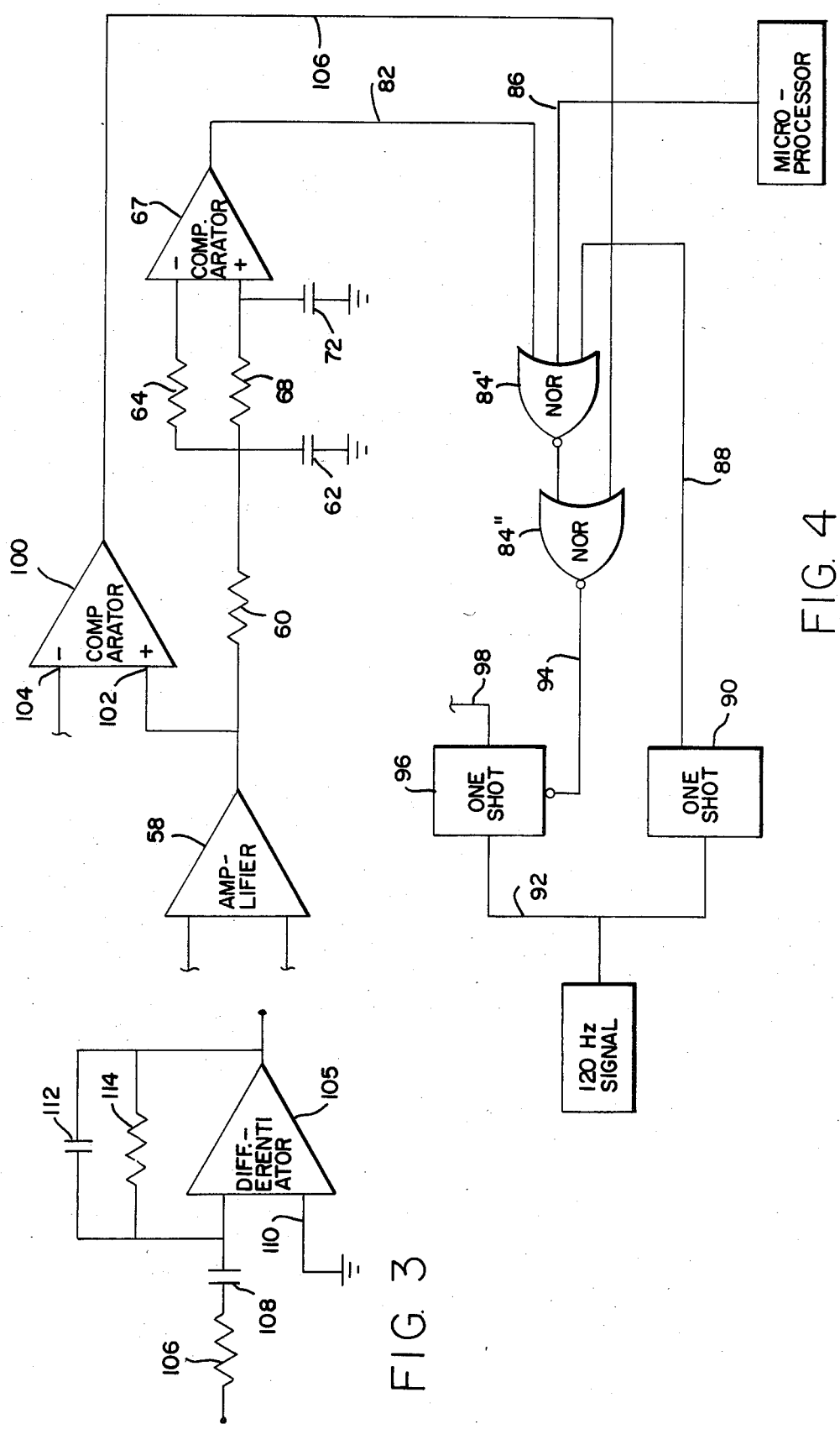

METHOD AND APPARATUS FOR MODULATING INVERTER PULSE WIDTH

This invention relates to an inverter for powering a load connected through a ferroresonant transformer, and more particularly to a method and apparatus for modulating the pulse width of the power switching devices in such an inverter.

BRIEF DESCRIPTION OF THE PRIOR ART

Heretofore, it has been known to use a ferroresonant transformer with an inverter. A ferroresonant transformer is particularly advantageous when used with an inverter for an uninterrupted power supply ("UPS") because of such transformer's ability to maintain normal power flow in a load while a transfer is made between the A.C. line and inverter or back to A.C. line. However, with such type transformer it is essential that the current switches in the inverter, be they SCRs, MOSFETs or power transistors, etc., be made nonconductive before the ferroresonant transformer reaches a saturated state. As is well known, after a ferroresonant transformer reaches full core saturation, current rises dramatically and is capable of causing component damage. Various attempts have been made to regulate or measure core saturation in transformers, for example, see U.S. Pat. Nos. 4,333,139 and No. 4,439,822. These attempts have tried to utilize the magnetic flux or force itself, and not the current caused by saturation.

As is shown for a half cycle in FIG. 1 by solid line 10, the current flow through the inverter-ferroresonant transformer circuit plotted with respect to time, first rises with a positive slope to a peak 12, then declines at a negative slope, reaches a minimum 14 (hereinafter referred to as the "minimum"), and then rises very quickly to very high values at core saturation, as indicated by the arrowhead 16. As is shown, at the peak value 12 and at the minimum 14, the slope with respect to time (di/dt) is zero.

Various schemes have been used in the past to modulate an inverter pulse width to match the power being supplied from the inverter and its batteries to that required by the load. Some schemes simply compensated for changes in battery voltage as the batteries discharged. Other schemes used output A.C. voltage. Still others measured current, either on the A.C. or D.C. side, and then adjusted the inverter pulse width to meet the needs, high power requirements being met with wide pulse widths, while lower power demands result in the pulse width being narrowed. Of course, too narrow or wide a pulse width can cause the ferroresonant transformer to collapse or saturate.

However, there were problems associated with the prior art techniques. Response times were slow. Generally several cycles were needed to make the adjustment, and during the transition, the supplied power may not be as regular as desired. If during the transition a high current resulted, there could be an undesirable oversaturation of the ferroresonant transformer and an accompanying failure to commutate. This was a major difficulty for most switching devices, including SCR inverters. Additionally, the failure to quickly adjust could cause instability problems, over or under dampening associated with load changes, and oscillation or hunting in the circuit. Often times the prior art techniques utilized one or more potentiometers, which had to be adjusted to achieve the desired pulse width modulation. With such construction, there was the added task of calibrating and adjusting these potentiometers.

Also, with prior art techniques the switching devices were commutated at above the minimum current, resulting generation of in higher electromagnetic components, causing radio or magnetic interference.

SUMMARY OF THE PRESENT INVENTION

The method and apparatus for pulse width modulating an inverter for use with a ferroresonant transformer of the present invention has eliminated the above problems and results in a more efficient, quieter operating inverter, generating less radio-magnetic interference. The present invention results in greater efficiency, nearly instantaneous response, no calibration problems, and eliminates dampening problems and excess currents.

The method of the present invention for modulating the pulse width of an inverter using a ferroresonant transformer comprises the steps of providing one pulse width for each half cycle and modulating or terminating the pulse width of the inverter at or near the minimum 14, when the rate of change of current with respect to time through the inverter ferroresonant transformer is substantially zero. The preferred method for practicing the invention includes utilizing the current flow through the inverter - transformer itself to generate a first signal which can then be utilized to modulate the pulse width and terminate the current through the respective legs of the inverter as the current reaches the desired minimum value. Various methods for detecting the zero slope could be utilized. A convenient method of practicing the invention is to generate two signals proportional to the current flowing through the inverter ferroresonant transformer, then aligning one of these signals to intersect the other at the desired location, detecting the crossing point between the two signals, and utilizing the detected crossing point to control pulse width modulation or to terminate the pulse. The first and/or second signal could be aligned by various methods, such as by relatively delaying the second signal and or biasing it to achieve crossover at the desired point where the slope, di/dt, is zero. As there may be a peak or high crossing point which is not of interest, an additional step of blanking or blocking out this high or peak crossing point before the minimum, such as with a timer or one shot, is provided. This blocking action can be conveniently accomplished by essentially blocking the detecting signal for the first part of each cycle. An additionally, transfer blocking step, may be provided during the first half cycle after transfer from the A.C. line to the inverter so that energy can flow into the transformer should the transfer occur during the latter part of a half cycle. Without this additional transfer blocking step, no energy would flow into the transformer in such circumstance. This transfer blocking step is then dropped out after completion of that first half cycle.

The apparatus of the present invention for modulating the pulse width of an inverter using a ferroresonant transformer comprises means for modulating or terminating the pulse width of the inverter at or near the minimum 14, when the rate of change of current with respect to time through the inverter-ferroresonant transformer is substantially zero. A preferred apparatus for doing so is by means for utilizing the current flow through the inverter-transformer itself to generate a first signal which can then be utilized to modulate or terminate the pulse width and commutate the current through the inverter as the current reached the desired minimum value. Various apparatus for detecting the zero slope could be utilized. A convenient apparatus comprises means for generating two signals proportional to the current flowing through the inverter-ferroresonant transformer, means for aligning one of these signals to intersect the other at the desired location, means for detecting the crossing point between the two signals, and means for utilizing the detected crossing point to control the inverter's pulse width by termininating the same. The first and/or second signal could be aligned by various means such as by introduction of capacitance to relatively delay the second signal and or biasing with a reference to achieve crossover at the desired point where the slope, di/dt is zero. As there may be a peak or high crossing point which is not of interest, means for blanking or blocking out this high or peak crossing point before the minimum value is detected, such as with a timer or one shot, is provided. This blocking action can be conveniently accomplished by essentially blocking the signal for only the first half of a A.C. half cycle. Additionally, transfer blocking means, again in the form of a timer or one shot, may be provided during the first half cycle after transfer from the A.C. line to the inverter so that energy can flow into the transformer should the transfer occur during the latter part of a half cycle. This transfer blocking means helps bring the inverter up from its stand by state, be it "off" or "idle", more quickly. This transfer blocking means is dropped out after the completion of that half cycle.

By modulating the pulse width at or near this minimum value current (di/dt=0), switching currents are at their lowest value, making switching easier and more reliable. Likewise, there is minimum acoustic noise and a minimum of electromagnetic interference. Further, the efficiency of the inverter is increased and battery draw down diminished.

Additionally, the method and apparatus of the present invention may include steps and apparatus for detecting a maximum current limit and terminating the pulse widh should such occur.

It is a primary object of the present invention to provide a method of and apparatus for modulating or terminating the pulse width of the inverter before saturation, preferably at or adjacent the minimum current point, wherein the slope di/dt is substantially zero.

Yet another object of the present invention is to utilize the current flow through the inverter - ferroresonant transformer to generate a signal which may be utilized for modulating the pulse width of the inverter at this minimum current.

Still another object of the present invention is to provide an inverter utilizing a ferroresonant transformer with higher efficiency and less acoustic and electromagnetic noise.

A further object is to include a maximum current limit feature.

A still further object is to provide a pulse width modulation circuit which does not need adjustment and automatically compensates for load changes.

These and other objects of the present invention will become apparent from the following written description and accompanying figures of the drawings.

BRIEF DESCRIPTION OF THE DRAWINGS

FIG. 1 plots current flow against time for an inverter with an ferroresonant transformer in solid lines and generated signals in dotted and dash line, the ordinate being of different scales and the abscisa representing time.

FIG. 2 is a schematic of an inverter and ferroresonant transformer having means of the present invention for modulating or terminating the inverter pulse width.

FIG. 3 is a schematic of an alternative suitable for use in a portion of the schematic shown in FIG. 2.

FIG. 4 is a schematic of yet another alternative suitable for use in a portion of the schematic shown in FIG. 2.

DESCRIPTION OF THE PREFERRED EMBODIMENT

Referring to FIG. 2, a ferroresonant transformer 20 and an inverter 22 are shown for powering a load represented by the resistance 24. Normally, the load 24 is powered through the ferroresonant transformer 20 by a main source of power usually connected to the A.C. line through terminals 26 and 28 and having an A.C. line input winding 30. From winding 30, power can be transmitted through the ferroresonant transformer to the load output winding 32, across which the load 24 is connected. The ferroresonant transformer 20 also includes a tank circuit having a capacitor 34 connected across winding 32 and an additional harmonic compensating winding 36.

However, when the A.C. line's condition is such that it is not desirable to power the load 24 therefrom, the inverter may be provided with conventional means (not shown) to switch from the A.C. line to the inverter 22. As is shown schematically in FIG. 2, the inverter 22 comprises right and left current switching devices 38 and 40, respectively, which may be of any type, such as SCRs, MOSFETs, power transistors, etc. These devices 38 and 40, in turn, are connected at one of their respective (upper) ends to a pair of right and left inverter windings 42 and 44, which are joined at their opposite ends to a common point and each other. A battery 46 is connected through a shunt resistor 50 between this common point, and the opposite respective (lower) ends of switching devices 38 and 40. Thus, when either device 38 or 40 is conducting, a current (referred to as the inverter-ferroresonant transformer current) will flow in the connector 48 and the shunt resistance 50 which is connected to the battery. While a battery is shown, it should be understood that other D.C. sources could be used, such as a photovoltaic array. While not shown, the switching devices 38 and 40 are of the three gate type, and have a control gate (not shown) connected to a drive control 52 for driving the left and right switching devices 38 and 40 as is conventional, which is schematically represented by the letters "R" and "L" and the arrowheads 54 and 56. In this inverter, the drive control 52 drives each switching device 38 or 40 for a single pulse which would be of a half cycle duration unless the pulse is terminated earlier by the circuit of the present invention.

As was discussed, it is desirable to modulate the pulse width of the inverter in such a manner that the current through the right or left switching devices 38 and 40, and consequently the battery 46 and windings 42 or 44, cease at or near the minimum point 14, wherein the slope di/dt is substantially zero. In order to sense this current in the modulation method and apparatus of the present invention, the shunt resistor 50 is provided. To minimize current loses shunt resistor 50 is about 1 milliohm value and of a suitable power rating for the expected inverter current flow. This shunt resistor 50 causes a voltage signal representative of the current flow through the shunt resistor 50, and consequently in the inverter-ferroresonant transformer, to be led to the amplifier 58 where it is amplified, for example by a constant gain of 40. The amplified signal from amplifier 58 is feed to a noise attenuation circuit comprising the resistor 60 and capacitor 62, the latter being grounded. These components are selected to provide a time constant of about 100 microseconds, a 1K ohm resistor and .1 microfarad capacitor being suitable.

From the common junction between resistor 60 and capacitor 62, the noise attenuated signal is bifurcated to establish a convenient means for detecting the desired zero slope locus. As is shown, the bifurcated signal is fed through a resistor 64 to establish a first signal which in turn is led to an inverting input 66 of the IC comparator 67. The second signal derived from the bifurcation is led through a resistor 68 of about the same ohm value connected to a non-inverting input 70 of IC comparator 67. The junction between the resistor 68 and input 70 is connected to ground by a capacitor 72 to cause the second signal to input 70 to be delayed or lag the first signal to input 66. Resistors 64 and 68 cancel the common mode effects of comparator 67. If the first signal at input 66 were plotted on FIG. 1, it also could be represented by the solid line 10. Likewise, the second signal at input 70 could be represented by the dotted line 76; it being attenuated in magnitude due to RC network of resistor 68 and capacitor and delayed somewhat as mentioned above. Resistors 64 and 68 could be about 1K ohms, while capacitor 72 could be of 0.1 microfarads. As shown, these two curves, 10 and 76, intersect each other at a high point 78, near where the current peaks in the first portion of the half cycle, and again at the lower point 80 in the latter part of the half cycle, near minimum 14. As noted earlier, and as will be hereinafter explained, the upper crossing point 78 is not of interest and will be blanked, while the lower crossing point 80 is detected by the comparator 67, and used to terminate the pulse width of the inverter. Thus, the comparator and the circuit described are a convenient and economical way in which to detect di/dt substantially equal to zero and then derive a pulse width termination point. In the circuit described, the amplifier 58 and comparator 67 could be provided by a Motorola 33074.

However, it should be noted that while point 80 is substantially close to the point 14, there is still a small horizontal (time) difference. While for many instances this difference may be insignificant, and the presently described circuit suitable, it may be desired in other instances to further optimize the pulse termination or commutation point so that pulse width modulation or termination occurs even closer to or at minimum point 14.

Where such optimization is desired, either the first or second signal could be shifted by known techniques, such as the introduction of a phase shift or by biasing with a reference voltage so that the intersection of the two curves occurs at the point where the current flow through the inverter-ferroesonant transformer occurs at di/dt equal to zero or exactly at the minimum 14. Of course, it would be desirable to have the first and second signals form a well-defined crossing point; that is the curves intersect at some well defined angle, as compared to nearly coinciding. Such well defined crossing could be achieved in one manner by biasing curve 10 relatively upwardly, slightly so that the minimum would intersect curve 76 at a relatively sharp angle. Such an upwardly biased curve is partially illustrated by a series of dashes in FIG. 1 and numbered 10' with the intersection point 14'. Biasing the signal 10 upwardly to form 10' can be accomplished in a known manner by the addition of a suitable reference voltage. Alternatively, the second signal 76 could have been biased relatively downwardly to achieve a similar result.

Further, the necessary adjustment to first and second signals can be readily achieved by standard calculation techniques and fixed value components used to make such alignments. There is no need to use adjustable elements, such as potentiometers. If desired to check whether the selected fix value components are working satisfactory, either at the factory or in the field, the inverter current and first signals 10 (or 10')and second signal 76 can be displayed versus time on an oscilliscope, and the crossing point 80 (or 14') of signals 10 (or 10') and 76 verified.

The crossing point (80 or 14') of first signal 10 or 10' and second signal 76 detected by compacator 67 is outputted to a conductor 82, which in turn is connected to one input pin of an OR gate 84. Another input pin to the OR gate 84 receives a signal, via by conductor 86, from the microprocessor (not shown) forming part of the logic controls for the uninterrupted power supply. The microprocessor generates a high to the OR gate on conductor 86 for the first half cycle after transfer from the A.C. line to the inverter so that should this transfer occur during the latter part of the of half cycle, the output comparator 67 will not inhibit energy flow to the inverter for the remainder of this first half cycle. This is particularly advantageous should the inverter at the time of transfer have been in an "off" state, and not merely in an "idle" state, prior to being turned on.

A conductor 88 also connects one of the input pins of OR gate 84 to the output of an IC one shot 90, which in turn, has its input connected by conductor 92 to a source of 120 hz signal. IC one shot 90 in cooperation with OR gate 84 blanks out the first or high crossing point 78 (which is of no interest) where di/dt may also be near zero. Additionally, the output of OR gate 84 is connected by conductor 94 to the reset pin of another IC one shot 96, which is, in turn, connected to the same 120 hz source by conductor 92. The output of IC one shot 96 is connected by conductor 98 to the right and left switching device drive control 52, previously mentioned. One shot 96 is provided to terminate the pulse width just prior to the half cycle, regardless of the state of the remainder of the circuit of the present invention. The 120 hz signal for IC one shot 96 will operate each half cycle, while the signal from OR gate 84 on conductor 94 functions as a reset and is reset each half cycle. While not shown, a suitable RC network would be provided on the input of one shot 96 from conductor 92 to prevent undesired triggering due to racing. When one shot 96 outputs, it causes drive control 52 to chop or terminate the pulse in a conventional manner. Thus, the device 38 or 40 would have a shortened pulse width of less than one half cycle. A Motorola 4538 could be used for the one shots 90 or 96.

Referring to FIG. 3, if desired, a differentiator 105 with a resistor 106 and capacitor 108 in series on one input pin, could be connected to the output pin of IC amplifier 58, instead of the components 60, 62, 64, 67, 68 and 72. The other input pin 110 of differentiator would be grounded. A capacitor 112 and resistor 114 are connected in parallel across the first input pin and output pin of differentiator 105. The output pin of differentiator 105 is connected to conductor 82 of FIG. 2. While suitable, the differential type device may be more sensitive to noise than would the comparator.

Referring to FIG. 4, the present circuit can be readily adapted to provide a maximum current limiting function or safety feature. In FIG. 4, the relevant portions of the schematic of FIG. 2 are shown and are given the same reference numerals as in FIG. 2. The principal differences between FIGS. 2 and 4 are that a comparator 100 is added and a pair of NOR gates 84' and 84" are substituted for OR gate 84. Comparator 100 has an input pin 102 connected to the junction of the output of amplifier 58 and one end of resistor 60. The other input pin 104 of comparator 100 is connected to a suitable reference voltage source (not shown) of a magnitude representative of the maximum current limit to flow in the inverter-ferroresonant transformer. This maximum current limit is above that which the inverter would see during normal operation with even a maximum rated load. The output of comparator 100 (when the detected signal at 102 exceeds that of the reference at 104), via conductor 106, is outputted to one of the inputs of the second NOR gate 84". The other input to NOR gate 84" is the output of the first NOR gate 84'. Previously described conductors 82, 86 and 88 are inputted to NOR gate 84'. With respect to the inputs on conductors 82, 86 and 88, the two NOR gates 84' and 84' function in a manner similar to the OR gate 84. With respect to the output of comparator 100 on conductor 106, the NOR gate 84' will cause the one shot 96 to terminate or inhibit the remainder of the pulse width of switching devices 38 or 40 upon detection of a signal representative of excess maximum current flow.

The operation of the circuits just described is as follows. Upon the initiation of a transfer from the A.C. line to the inverter, one of the swtiching devices 38 or 40 become conductive and will not be terminated or commutated until the and of the first half cycle to help bring the inverter on. This initial commutation point will be controlled by the signal on line 86 from the microprocessor. After this first half cycle, the remainder of the circuit above described, takes over, and the pulse width is terminated at or near the mininum current value 14 (or 80), when di/dt is substantially zero. At this minimum current point the noise of the inverter and its magnetic interference are minimized, while its operating efficiency is maximized. If the alternative of FIG. 4 is included, should an excess current be detected, such as on start up or anytime thereafter, the pulse width would immediately be terminated.

The greater operating efficiency is due to the fact that if termination occurs after di/dt equals zero, the additional current flow is generally wasted in the core saturation. If termination occurs prior to di/dt equals to zero, then the amount of energy that could have been put into the inverter efficiently, is reduced, and the inverter's initial turn on performance suffers. The latter is undesirable in an uninterruptable power supply which must transfer from A.C. line to the inverter without any change noticable by the load. Use of the present invention is ever more desirable in an inverter having a stand by state of "off", and not merely one of "idle"; as the additional energy inputted with the present invention helps to achieve a faster "turn on" from the "off" state.

Further, due to the fact that the pulse width termination or SCR commutation point is determined or derived from the inverter-ferroresonant transformer current itself, the termination or commutation point automatically adjusts for high or low loads. If in FIG. 1, curve 10 and point 14 are representative of a high load and its desired termination point, then curve 110 and the desired termination point 112 would be representative of a low load. Thus, the present invention inherently and automatically adjusts the pulse width termination or commutation point for various loads powered by the inverter.

While the present invention was illustrated and described with a battery and an inverter with two legs, one for each half cycle of A.C., it should be understood that other D.C. sources and/or an inverter with another type construction could also be utilized with the present invention. Further, the term commutation has been used herein to mean termination of the pulse, regardless of the type switching device.

While the preferred method and apparatus for pulse width modulation has been illustrated and described, from the foregoing it should be understood that variations, modifications and equivalent steps and structures thereof fall within the scope of the appended claims.

What is claimed:

1. In an inverter for use with a ferroresonant transformer for powering an A.C. load from a D.C. source, the inverter having at lesat one current pulse from the D.C. source per A.C. half cycle, said current pulse being variable in width, the ferroresonant transformer having at least one input winding for said D.C. source and an output winding for said A.C. load, the improvement comprising means for detecting when the current flow for said input winding for the inverter-ferroresonant transformer is substantially at zero slope and a low value prior to saturation, and means for terminating the pulse width of the inverter, said means for terminating the pulse width being operated by said means for detecting substantially upon the occcurance of said zero slope and low value of said current prior to saturation, whereby the inverter pulse width is terminated before saturation can occur.

2. In an inverter as in claim 1, further comprising means for momentarily delaying termination of said pulse width substantially thereat said zero slope and low value when the inverter goes from a stand-by state to a running state.

3. In an inverter as in claim 2, wherein said inverter is idling when in said stand-by state.

4. In an inverter as in claim 2, wherein said inverter is off when in said stand-by state.

5. In an inverter as in claim 1, wherein said means for detecting further comprises means for generating a first signal proportional to said current, said means for detecting sensing the zero slope and low value of said first signal, and said means for detecting operating said means for terminating the pulse width upon the occurance of substantially said zero slope and low value of said first signal.

6. In an inverter as in claim 5, wherein said means for detecting further comprises means for generating a second signal proportional to said first signal but different therefrom, said means for detecting also sensing said second signal and generating a third signal operating said means for terminating the pulse width when one of said first and second signals exceeds the other of said first and second signals substantially at said zero slope and low value of said current flow.

7. In an inverter as in claim 6, further comprising means for relatively shifting one of said first and second signals to cause the generation of said third signal closer to said zero slope and low value of said current flow.

8. In an inverter as in claim 7, further comprising means for relatively shifting the other of said first and second signals.

9. In an inverter as in claim 7, wherein said means for relatively shifting consists of one of more fixed value elements.

10. In an inverter as in claim 9, wherein said one or more fixed value elements comprises a capacitor for relatively delaying one of said first and second signals.

11. In an inverter as in claim 9, wherein said one or more fixed value elements comprises a reference voltage for relativly biasing one of said first and second signals.

12. In an inverter for use with a ferroresonant transformer to power an A.C. load from a D.C. source, the inverter having at least one current pulse power A.C. half cycle, the ferroresonant transformer having at least one inverter input winding and an output load winding, the improvement comprising means for detecting the current in the inverter-ferroresonant transformer substantially at a minimum value just prior to saturation, means for terminating the pulse width of the inverter substantially thereat said minimum value, and means for detecting a maximum current limit in said inverter-ferroresonant transformer, said mean for detecting a maximum current limit being connected to said means for terminating the pulse width, whereby the inverter pulse width is terminated before saturation or the pulse width will immediately be terminated upon the occurance of a current in excess of said maximum current limit.

13. In an inverter for use with a ferroresonant transformer for powering an A.C. load from a battery or from an A.C. line, the inverter providing a D.C. current pulse per A.C. half cycle, said D.C. current pulse being variable in width, the ferroresonant transformer having one D.C. input winding adapted to be connected to said D.C. source, an A.C. input winding adapted to be connected to the A.C. line, and a output load winding adapted to be connected to said load, the improvement comprising means for detecting when said D.C. currenet pulse for said one D.C. input winding approaches a minimum value with a di/dt near zero, means for momentarily delaying termination of said D.C. current pulse width near said minimum upon the first half cycle when transferring from the A.C. line to the inverter, means for generating a first signal proportional to said D.C. current pulse, said means for detecting sensing said first signal, means for generating a second signal proportional to said D.C. current pulse, said means for detecting also sensing said second signal, means for relatively shifting said first and second signals to substantially cross at said minimum, said means for detecting generating a third signal when said first and second signals cross substantially at said minimum, means for blocking termination of said D.C. current pulse width when said D.C. current pulse is high and di/dt is also near zero, and means for utilizing said third signal to terminate said D.C. current pulse width, whereby the inverter D.C. current pulse width is terminated prior to saturation.

14. A method for terminating a D.C. pulse width in an inverter for use with a ferroresonant transformer for powering an A.C. load from a D.C. source, the ferroresonant transformer having at least one inverter input winding and an output load winding, comprising the steps of detecting when the current in the inverter-ferroresonant transformer approaches a zero slope minimum value just prior to saturation, and termination the D.C. pulse width for the input winding of the inverter substantially thereat said zero slope minimum value, whereby the inverter D.C. pulse width is terminated prior to the ferroresonant transformer reaching saturation.

15. The method of claim 14, further comprising the steps of generating a first signal proportional to said current, and sensing said first signal to determine when to terminate the D.C. pulse width.

16. In an inverter as in claim 15, further comprising the steps of generating a second signal proportional to said current but different from said first signal, and detecting when one of said first and said second signals exceeds the other to determine when to terminate the D.C. pulse width.

17. The method of claim 16, further comprising the step of relatively shifting one of said first and second signals to cross at substantially the same time said current reaches a minimum value and its di/dt is near zero.

18. The method of claim 17, further comprising the step of momentarily delaying termination of said D.C. pulse width when the load is initially transferred from the A.C line to the inverter.

19. The method of claim 14, comprising the step of generating only a single pulse of D.C. current for each A.C. half cycle and terminating the pulse prior to the end of each half cycle when the current is at the minimum value.

20. A method for terminating pulse width in an inverter for use with a ferroresonant transformer for powering an A.C. load from a D.C. source, the ferroresonant transformer having at least one inverter input winding and an output load winding, comprising the steps of detecting when the current in the inverter-ferroresonant transformer approaches a minimum value just prior to saturation, and terminating the pulse width of the inverter substantially thereat the minimum value, detecting a maximum permissible current limit, and terminating the pulse width immediately should a current in excess of the maximum permissible current limit be detected, whereby the inverter pulse width is terminated prior to saturation or immediately should a current in excess of the maximum permissible current limit be detected.

* * * * *